US010816813B1

United States Patent
Goslin et al.

(10) Patent No.: US 10,816,813 B1
(45) Date of Patent: Oct. 27, 2020

(54) SYSTEMS AND METHODS FOR ENHANCING ACCURACY OF SPATIAL LOCATION AND ROTATIONAL ORIENTATION DETERMINATION OF WEARABLE HEAD-MOUNTED DISPLAY DEVICE

(71) Applicant: Disney Enterprises, Inc., Burbank, CA (US)

(72) Inventors: Michael P. Goslin, Los Angeles, CA (US); Timothy M. Panec, Burbank, CA (US); Corey D. Drake, Burbank, CA (US); Jason Yeung, Burbank, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/376,994

(22) Filed: Apr. 5, 2019

(51) Int. Cl.
*G02B 27/01* (2006.01)
*G01C 21/34* (2006.01)

(52) U.S. Cl.
CPC ..... *G02B 27/0179* (2013.01); *G01C 21/3407* (2013.01); *G02B 27/017* (2013.01);
(Continued)

(58) Field of Classification Search
CPC .............. G02B 27/0179; G02B 27/017; G02B 2027/0183; G02B 2027/0187; G02B 27/0172; G02B 2027/0147; G02B 2027/0138; G02B 2027/014; G01C 21/3407; G06F 3/14; G06F 3/012; G06F 3/013; G06F 3/04847; G09G 5/377; G09G 5/391; G09G 2340/0407; G09G 2340/12; G09G 2380/12; G09G 2370/00
See application file for complete search history.

(56) References Cited

U.S. PATENT DOCUMENTS 6,757,068 B2 * 6/2004 Foxlin ................. G02B 27/017
356/139.03
9,766,075 B2 * 9/2017 Foxlin ..................... G02B 27/06
(Continued)

OTHER PUBLICATIONS

Feel Three Motion Simulator update—launch incoming! OculusVR Forums; https://forums.oculusvr.com/community/discussion/67817/feel-three-motion-simulator-update-launch-incoming (retrieved from the internet on Apr. 5, 2019); 17 pages.

*Primary Examiner* — Bryan Earles
(74) *Attorney, Agent, or Firm* — Esplin & Associates, PC

(57) ABSTRACT

Systems and methods for enhancing the accuracy of spatial location and rotational orientation determination of a wearable head-mounted display device while in a motion simulating vehicle are disclosed. Exemplary implementations may: generate output signals conveying vehicle information; generate output signals conveying user information of a user; obtain presentation information; determine, based on the user information and the vehicle information, spatial location and rotational orientation of the wearable head-mounted display device with respect to a reference frame such that accuracy of the determination is enhanced with respect to only using the user information; determine a view of the virtual space that corresponds to the spatial location and the rotational orientation of the wearable head-mounted display device determined; and effectuate, via the wearable head-mounted display device, presentation of the view of the virtual space.

15 Claims, 6 Drawing Sheets

(52) U.S. Cl.
CPC ........... *G02B 2027/0183* (2013.01); *G02B 2027/0187* (2013.01)

(56) References Cited

U.S. PATENT DOCUMENTS

| | | | |
|---|---|---|---|
| 9,928,653 B2* | 3/2018 | Atsmon | G02B 27/017 |
| 9,996,149 B1* | 6/2018 | Martin | G02B 27/017 |
| 10,289,194 B2* | 5/2019 | McCracken | G06F 1/163 |
| 10,365,481 B2* | 7/2019 | Thomas | G02B 27/0093 |
| 2015/0097864 A1* | 4/2015 | Alaniz | G06T 7/20 |
| | | | 345/633 |
| 2015/0279050 A1* | 10/2015 | Yang | G06T 19/006 |
| | | | 345/633 |

* cited by examiner

US 10,816,813 B1

SYSTEMS AND METHODS FOR ENHANCING ACCURACY OF SPATIAL LOCATION AND ROTATIONAL ORIENTATION DETERMINATION OF WEARABLE HEAD-MOUNTED DISPLAY DEVICE

FIELD OF THE DISCLOSURE

The present disclosure relates to systems and methods for enhancing the accuracy of spatial location and rotational orientation determination of a wearable head-mounted display device while in a motion simulating vehicle.

BACKGROUND

Head tracking is known among virtual reality (VR) systems and augmented reality (AR) systems. However, VR and AR tracking systems assume a user is stationary (i.e., sitting down) or in a restricted space (e.g., a living room). If the user is in a moving vehicle (e.g., a car) and a VR head-mounted display device is head tracking the user's head, the tracking system may get confused with detected secondary motions of the moving vehicle. The tracking system fails to maintain a consistent reference point and therefore display of a virtual space to the user may be off. Furthermore, personal motion simulators may be expensive to obtain to use in conjunction with VR systems.

SUMMARY

The present invention is directed to utilizing simulated motion of a vehicle in addition to user motion of a VR head-mounted display device to enhance accuracy of determination of spatial location and rotation orientation of a head-mounted display device of a user. The determination may facilitate presentation of views of a virtual space to the user.

One aspect of the present disclosure relates to a system configured to enhance accuracy of spatial location and rotational orientation determination of a wearable head-mounted display device while in a motion simulating vehicle. The system may include one or more of sensors and hardware processors configured by machine-readable instructions. The sensor(s) may be configured to generate output signals conveying vehicle information. The vehicle information may characterize vehicle operations of a vehicle. The sensor(s) may be configured to generate output signals conveying user information of a user. The user information may characterize motion of a wearable head-mounted display device mounted on the user's head. The processor(s) may be configured to obtain presentation information. The presentation information may define values of virtual space parameters. The virtual space parameters may characterize an instance of a virtual space including virtual objects. Virtual objects may include avatars, characters, weapons, and/or others. The processor(s) may be configured to determine, based on the user information and the vehicle information, spatial location and rotational orientation of the wearable head-mounted display device with respect to a reference frame. Accuracy of the determination of the spatial location and the rotational orientation of the wearable head-mounted display device may be enhanced with respect to only using the user information. The processor(s) may be configured to determine a view of the virtual space. The virtual space may correspond to the spatial location and the rotational orientation of the wearable head-mounted display device determined. The processor(s) may be configured to effectuate presentation of the view of the virtual space.

Effectuation may be via the wearable head-mounted display device.

Another aspect of the present disclosure relates to a method. The method may include generating output signals conveying vehicle information. The vehicle information may characterize vehicle operations of a vehicle. The method may include generating output signals conveying user information of a user. The user information may characterize motion of a wearable head-mounted display device mounted on the user's head. The method may include obtaining presentation information. The presentation information may define values of virtual space parameters. The virtual space parameters may characterize an instance of a virtual space including virtual objects. The virtual objects may include avatars, characters, weapons, and/or others. The method may include determining, based on the user information and the vehicle information, spatial location and rotational orientation of the wearable head-mounted display device with respect to a reference frame. Accuracy of the determination of the spatial location and the rotational orientation of the wearable head-mounted display device may be enhanced with respect to only using the user information. The method may include determining a view of the virtual space. The virtual space may correspond to the spatial location and the rotational orientation of the wearable head-mounted display device determined. The method may include effectuating presentation of the view of the virtual space. Effectuation may be via the wearable head-mounted display device.

Yet another aspect of the present disclosure relates to a non-transient computer-readable storage medium having instructions embodied thereon, the instructions being executable by one or more processors to perform the method described above.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

DETAILED DESCRIPTION

Figure 1:
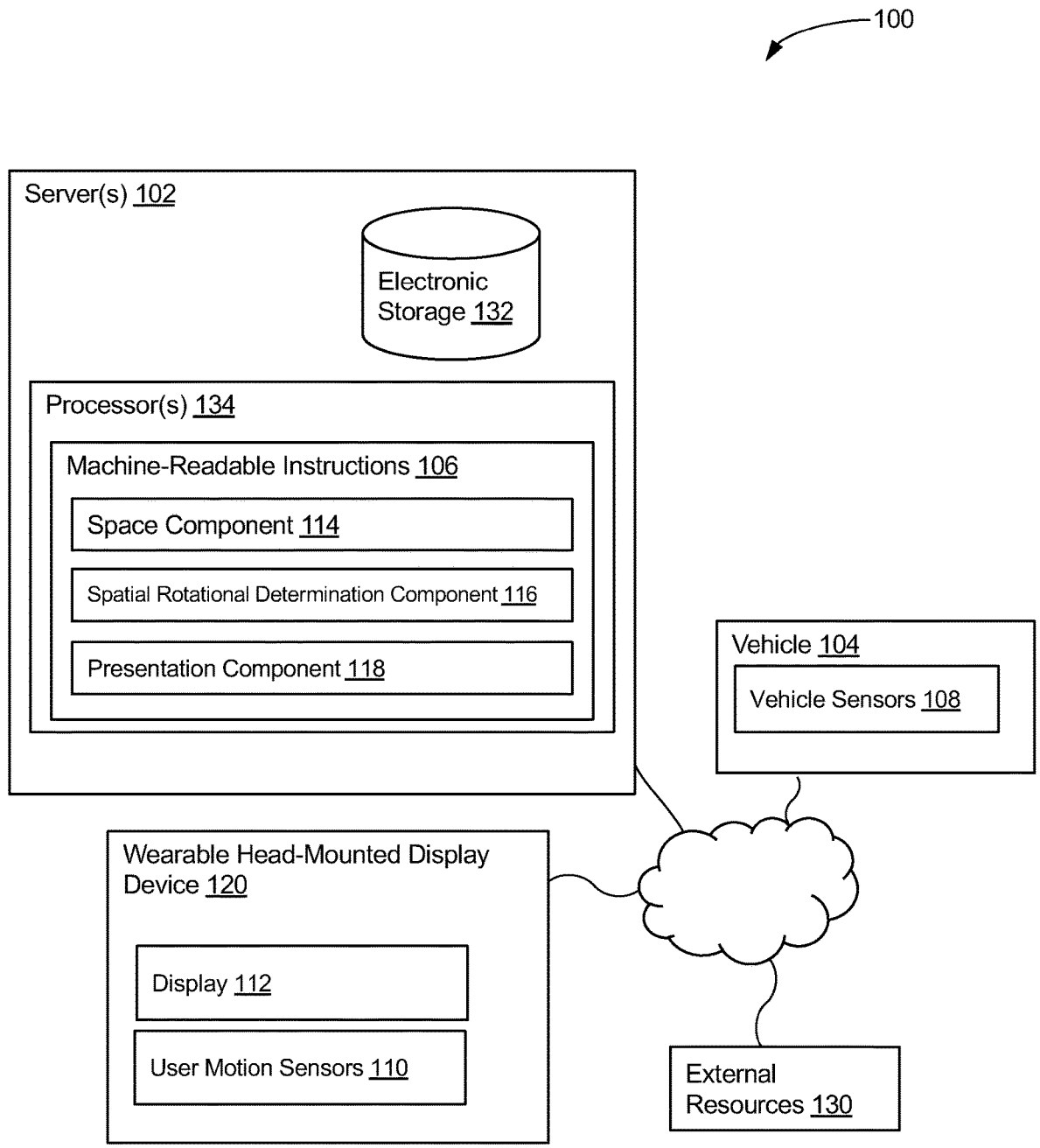
FIG. 1 illustrates a system configured to enhance accuracy of spatial location and rotational orientation determination of a wearable head-mounted display device, in accordance with one or more implementations.

FIG. 1 illustrates a system 100 configured to enhance accuracy of spatial location and rotational orientation determination of a wearable head-mounted display device, in accordance with one or more implementations. In some implementations, system 100 may include a vehicle 104, one or more wearable head-mounted display devices 120, and/or one or more servers 102. Server(s) 102 may be configured to communicate with vehicle 104 according to a client/server architecture and/or other architectures.

Vehicle 104 may be motion simulating such that vehicle 104 outputs sensible motion while in motion. Vehicle 104 may include vehicle sensors 108. Vehicle sensors 108 may be configured to generate output signals conveying vehicle information. The vehicle information may characterize vehicle operations of a vehicle. The vehicle operations may be defined by parameter values for one or more vehicle parameters. The vehicle parameters may include the vehicle's speed, acceleration, brake engagement, steering wheel position, time derivatives of steering wheel position, throttle, time derivatives of throttle, gear, exhaust, revolutions per minutes, mileage, emissions, and/or other vehicle operations. By way of non-limiting example, vehicle 104 may be one of a motor vehicle, theme park ride (e.g., rollercoaster), tracked vehicle, aircraft, watercraft, train, tram, motion simulator, and/or other vehicle. Motor vehicles may include cars, buses, trucks, vans, and/or other motor vehicles. Aircrafts may include helicopters, turboprop aircrafts, piston aircrafts, jets, narrow body aircrafts, wide body airliners, and/or other aircrafts. Water vehicle may include ships (e.g., cruise ships), submarines, yachts, and/or other watercrafts.

Vehicle information may further include navigation information. The navigation information may define values of one or more navigation parameters. Navigation parameters may include active navigation instructions of the vehicle, current GPS position, origin (e.g., address, city, airport, harbor port, etc.) destination (e.g., address, city, airport, harbor port, etc.), and/or other navigation parameters of the vehicle such that future vehicle movements are known. Values of active navigation instructions may include a list of steps the vehicle may follow to arrive at a destination.

Vehicle sensors 108 may include by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, a depth sensor, a distancing sensor, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files. In some implementations, output signals generated by individual sensors (and/or information based thereon) may be streamed to one or more other components of the system.

Wearable head-mounted display device 120 may include a display 112, user motion sensors 110, and/or other sensors. Display 112 may be configured to present one or more of images, video, augmented reality images, and/or other information. Wearable head-mounted display device 120 may be one or more of glasses, goggles, helmets, helmets in which a handheld display may be coupled, and/or other devices. A handheld display may include one or more of a handheld screen, a smartphone display, a tablet display, and/or other handheld devices having a display.

User motion sensors 110 may be configured to generate output signals conveying user information of a user. The user information may characterize motion of wearable head-mounted display device 120. Motion may characterize intentional motion of the user's head, wherein the wearable head-mounted display device is mounted on the user's head, and unintentional motion. Intentional motion may define motion in which the user intended to execute. By way of non-limiting example, intentional motion may include rotation of the head to the left and/or rotation of the head to the right. Unintentional motion may define motion that is a reaction to the motion of the vehicle. Unintentional motion may include, by way of non-limiting example, bobbing of the head while driving on a bumpy road.

User motion sensors 110 may include, by way of non-limiting example, one or more of an accelerometer, a gyroscope, an inertial measurement sensor, Electronic nose, Infrared Imagers, Micro-bolometers, micro-displays (DMD), Digital micro-mirror device, Optical Switches, global positioning system sensors, a tilt sensor, a vibration sensor, an image sensor, a camera, a depth sensor, a distancing sensor, an ultrasonic sensor, an infrared sensor, degree-of-freedom sensors (e.g. 6-DOF and/or 9-DOF sensors), a compass, and/or other sensors in conjunction with computer vision processing.

Wearable head-mounted display device 120 may include other sensors. Other sensors may include, by way of non-limiting example, one or more of a light sensor, a microphone, an air speed sensor, a ground speed sensor, an altitude sensor, medical sensors (including but not limited to blood pressure sensor, pulse oximeter, heart rate sensor, etc.), and/or others.

Server(s) 102 may be configured by machine-readable instructions 106. Machine-readable instructions 106 may include one or more instruction components. The instruction components may include computer program components. The instruction components may include space component 114, spatial rotational determination component 116, presentation component 118, and/or other instruction components.

Space component 114 may be configured to obtain presentation information. The presentation information may define values of virtual space parameters. The virtual space parameters may characterize an instance of a virtual space including virtual objects.

The instance of the virtual space may comprise a simulated space that is accessible by the user and/or other users via a wearable head-mounted display device (e.g., wearable head-mounted display device 120, and/or other wearable head-mounted display devices) that presents the views of the virtual space to the user and/or other users. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space, and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The instance of the virtual space may include virtual space content determined based on individual virtual space content associated with individual objects and the arrangement(s) of the objects, and/or other information. The space component may use the instance of the virtual space to facilitate presentation of one or more views of the virtual space to a user. The space component may use the instance of the virtual space to enable a user to interact with the virtual space. In some implementations, the execution of the instance of the virtual space may include the space component executing an instance of a game within the virtual space. The virtual space may include views of virtual objects. The virtual objects may include non-user characters, virtual items (e.g., virtual food, virtual weapons, virtual clothing, etc.), and/or other virtual content.

The above description of the manner in which state of the virtual space is determined by space component 114 is not intended to be limiting. The space component 18 may be configured to express the virtual space in a more limited, or richer, manner. For example, views determined for the virtual space representing the state of the instance of the virtual space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the virtual space are contemplated.

Space component 114 may further be configured to obtain other information. Other information may include vehicle information, user information, and/or other information. The other information may facilitate determination of a presentation of one or more views of the virtual space to the user.

Spatial rotational determination component 116 may be configured to determine spatial location and rotational orientation of the wearable head-mounted display device. Determination may be with respect to a reference frame such that accuracy of the determination is enhanced with respect to only using the user information. Determination may be based on the user information and the vehicle information. Space component 114 may be configured to determine, based on the output signals, the vehicle information and/or the user information. Spatial location, as used herein, may refer to a geo-location of the wearable head-mounted display device 120, an elevation of the wearable head-mounted display device 120, seat in a car of the wearable head-mounted display device 120, area of a vehicle of the wearable head-mounted display device 120, and/or other measurements. Rotational orientation, as used herein, may refer to one or more of a pitch angle, a roll angle, a yaw angle, heading, pointing direction, and/or other measurements. In some implementations, the measurements may be specified with respect to the normal direction of the wearable head-mounted display device 120 relative to a surface on which it may be fixed at the base position. A reference frame may be a space through which vehicle 104 moves, vehicle 104 itself, or other reference frames.

Figure 3:
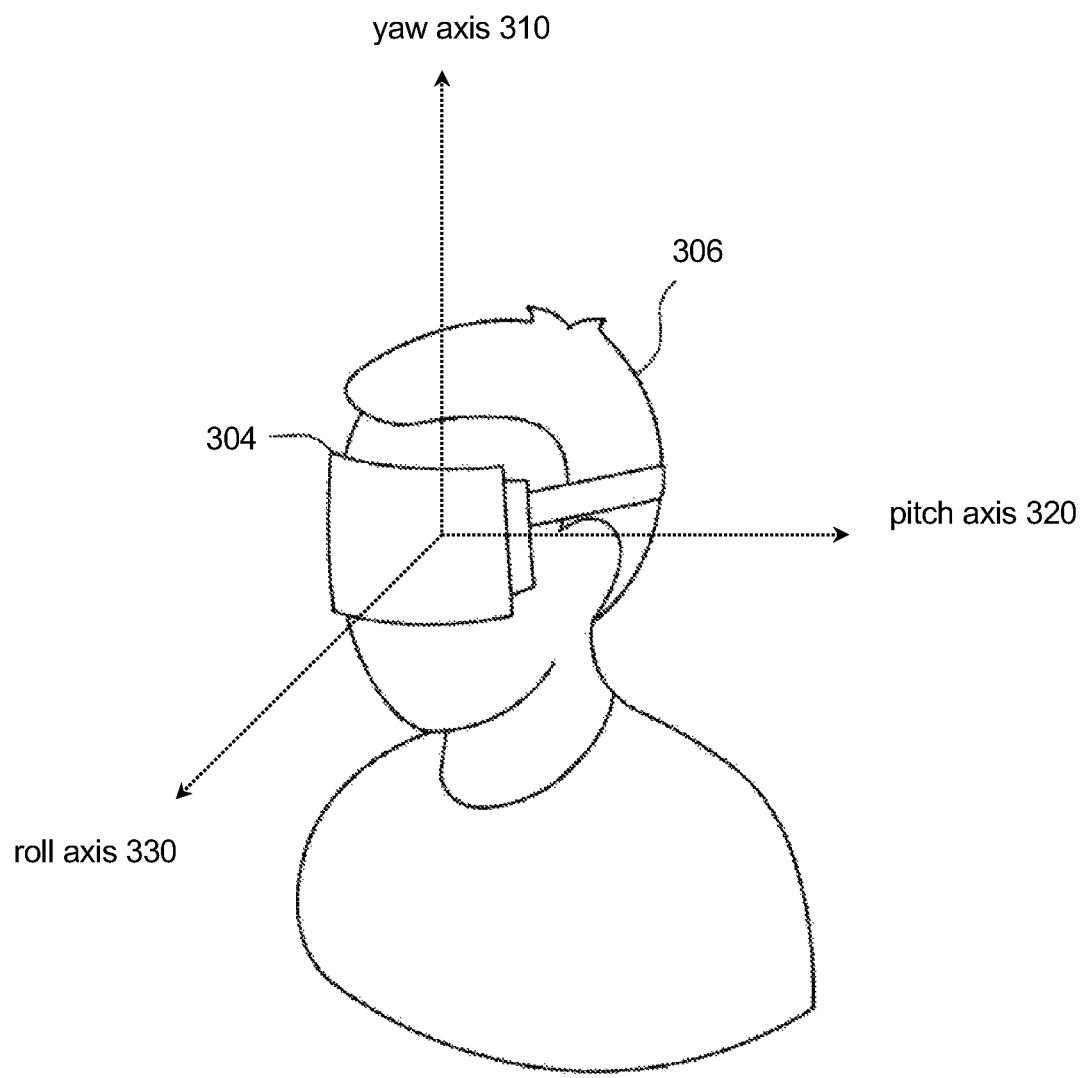
FIG. 3 illustrates rotational axes for the wearable head-mounted display device of a user, in accordance with one or more implementations.

FIG. 3 illustrates example rotational axes for a head-mounted display device on a user's head. Rotational axes for the head-mounted display device 304 of user 306 may include a yaw axis 310, a pitch axis 320, a roll axis 330, and/or other axes. Rotations about one or more of the yaw axis 310, the pitch axis 320, the roll axis 330, and/or other axes may define directions of view (e.g., viewing directions) for the head-mounted display device 300 (i.e., the user).

For example, a 0-degree rotation of the head-mounted display device 304 around the yaw axis 310 may correspond to a front viewing direction. A 90-degree rotation of head-mounted display device 304 around the yaw axis 310 may correspond to a right viewing direction. A −90-degree rotation of the spherical visual content 304 around the yaw axis 310 may correspond to a left viewing direction.

A 0-degree rotation of head-mounted display device 304 around the pitch axis 320 may correspond to a viewing direction that may be level with respect to horizon. A 45-degree rotation of head-mounted display device 304 around the pitch axis 320 may correspond to a viewing direction that may be pitched up with respect to horizon by 45-degrees. A 90-degree rotation of head-mounted display device 304 around the pitch axis 320 may correspond to a viewing direction that may be pitched up with respect to horizon by 90-degrees (looking up). A −45-degree rotation of head-mounted display device 304 around the pitch axis 320 may correspond to a viewing direction that may be pitched down with respect to horizon by 45-degrees. A −90-degree rotation of the spherical visual content 304 around the pitch axis 320 may correspond to a viewing direction that may be pitched down with respect to horizon by 90-degrees (looking down).

A 0-degree rotation of head-mounted display device 304 around the roll axis 330 may correspond to a viewing direction that may be upright. A 45-degree rotation of head-mounted display device 304 around the roll axis 330 may correspond to a viewing direction that may be rotated to the right by 45-degrees. A −45-degree rotation of head-mounted display device 304 around the roll axis 330 may correspond to a viewing direction that may be rotated to the left by 45-degrees. Other rotations and viewing directions are contemplated.

Referring back to FIG. 1, spatial rotational determination component 116 may be configured to, at specified points in time, determine spatial location and rotational orientation of the wearable head-mounted display device. The determination may be with respect to a reference frame such that accuracy of the determination is enhanced with respect to only using the user information. Determination may be based on the user information and the vehicle information. Specified points in time may include every n seconds, every n minutes, every n hours, every n measured distance traveled, every n motions of the user, and/or other specified points in time.

Space component 114 may be configured to determine a view of the virtual space. The view of the virtual space determined may correspond to the spatial location and the rotational orientation of the wearable head-mounted display device determined. The view of the virtual space determined may be enhanced such that when the user rotates his head while in a simultaneously moving vehicle, the view of the virtual space may correspond with the forces of the vehicle.

Presentation component 118 may be configured to effectuate the view of the virtual space determined. Effectuation may be via display 112 of wearable head-mounted display device 120.

In some implementations, the reference frame may be a space through which the vehicle is moving. Spatial rotational determination component 116 may be configured to determine the spatial location and the rotational orientation of the wearable head-mounted display device with respect to the space through which the vehicle is moving. The accuracy of the determination may, therefore, be enhanced with respect to only using the user information. Determination may be based on the user information and the vehicle information.

In some implementations, space component 114 may be configured to obtain the vehicle information. In some implementations, space component 114 may be configured to determine, based on the output signals, the vehicle information. Space component 114 may be configured to determine, based on the vehicle information, navigation information. As described above, the navigation information may include active navigation instructions of the vehicle and/or current GPS position of the vehicle such that future vehicle movements are known. Space component 114 may be configured to determine, based on the navigation information, the view of the virtual space. The view of the virtual space may correspond to, based on the navigation information, a space through which the vehicle is moving. Furthermore, the view of the virtual space may correspond to, based on the user information, the spatial location and the rotational orientation of the wearable head-mounted display device determined.

Figure 6:
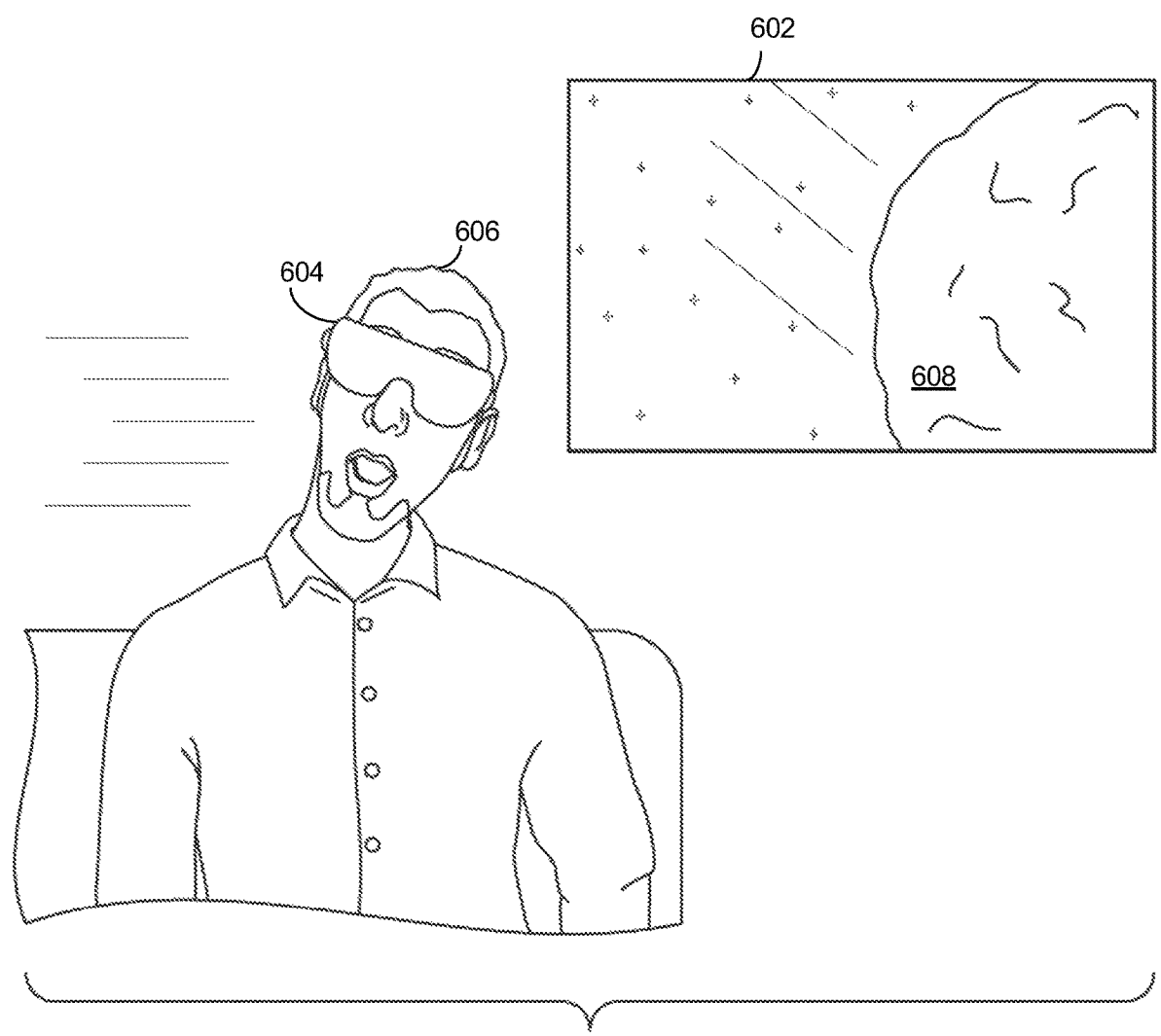
FIG. 6 illustrates an example of enhancing accuracy of spatial location and rotational orientation determination of a wearable head-mounted display device, in accordance with one or more implementations.

FIG. 6 illustrates an example of the system, in accordance with one or more implementations. User 606 may be in a car with active navigation instructions. The active navigation instructions may include that the car may be due to turn right on ABC Street, then left on DEF Road, and/or other instructions. Based on the determined GPS position of the car, it may be determined the vehicle is 200 feet from ABC Street. Space component 114 may be configured to determine, based on the navigation information determined, view 602 of a virtual space. The virtual space may correspond to the spatial location and the rotational orientation of the wearable head-mounted display device 604 of user 606 determined. It may be determined that user 606 is sitting in the second row of the car and far left seat and looking up and to the left. Determination may additionally correspond to the space through which the car is moving (i.e., turn on a road up ahead). Effectuation of presentation of view 602 of the virtual space, via the display of wearable head-mounted display device 604, to user 606 may correspond to user 406 seeing his virtual spaceship barely avoid virtual asteroid 608 above him by the car turning right.

By way of non-limiting example, the car's speed may be decreased to make the right turn on ABC Street. Effectuation of the determined view 602 of the virtual space, based on the vehicle information (i.e., right turn ahead, speed of the vehicle, deceleration of the vehicle), may correspond to, for example, user 604 seeing avoidance of the virtual asteroid 608 in slow motion.

Referring back to FIG. 1, in some implementations, the reference frame may be vehicle 104. Spatial rotational determination component 116 may be configured to determine the spatial location and the rotational orientation of the wearable head-mounted display device with respect to the reference frame. The accuracy of the determination may be enhanced with respect to only using the user information. The determination may be based on the user information and the vehicle information.

In some implementations, space component 114 may be configured to obtain the user information. In some implementations, space component 114 may be configured to determine, based on the output signals, the user information. The user information may define the GPS location of the user relative to the vehicle. Spatial rotational determination component 116 may be configured to determine, based on the user information and the vehicle information, the spatial location and rotational orientation of the head-mounted display device of the user relative to the vehicle.

Figure 5:
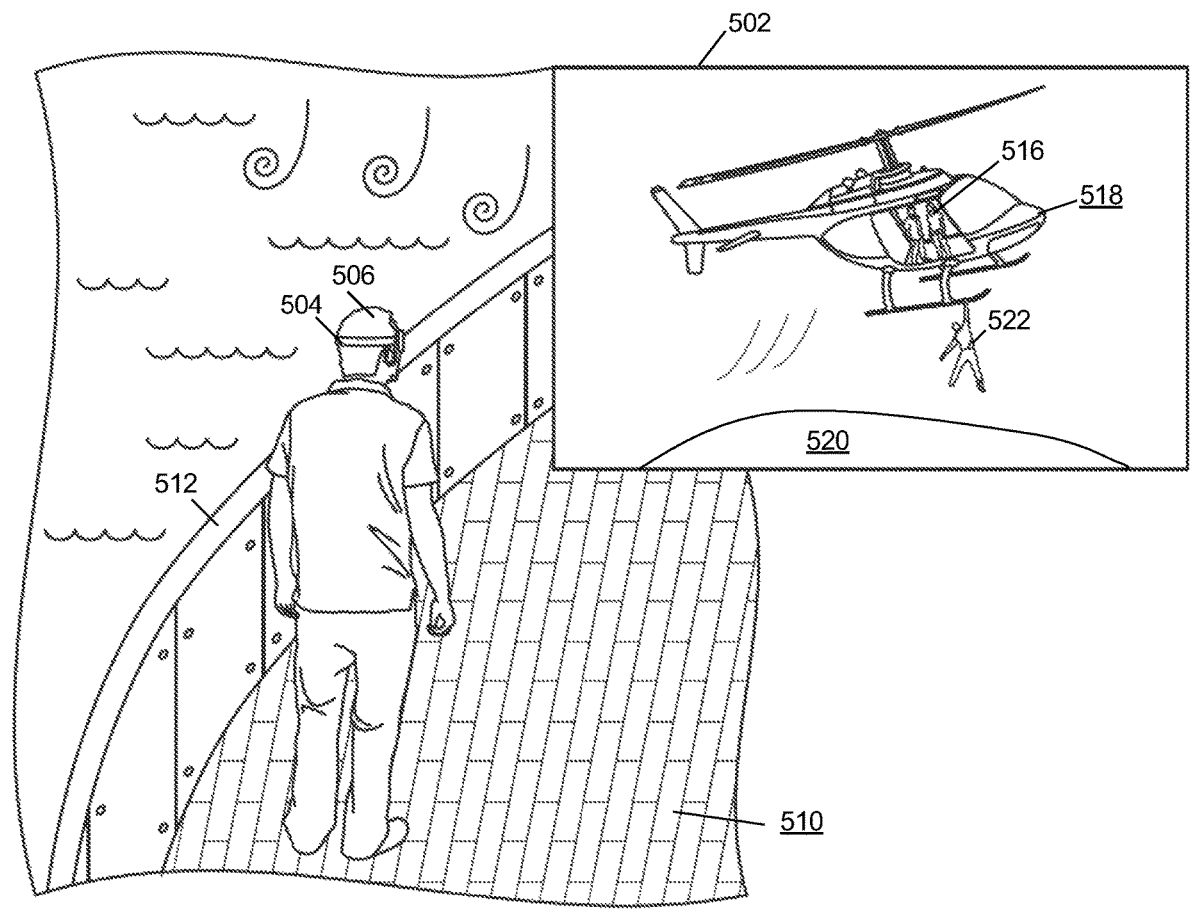
FIG. 5 illustrates an example of enhancing accuracy of spatial location and rotational orientation determination of a wearable head-mounted display device, in accordance with one or more implementations.

FIG. 5, illustrates an example of the systems and methods, in accordance with one or more implementations. The vehicle may be cruise ship 510 in which user 506 is free to move throughout. A cruise ship may be divided into several decks in which people may access and contains boundaries (e.g., edges of the decks, employee only areas, adult only areas, etc.). The cruise ship may further be divided into areas (e.g., lower level pool, theater, arcade, etc.). Based on the user information and the vehicle information (i.e., deck information, access information, etc.), the spatial location of wearable head-mounted display device 504 of user 506 may be determined as Upper Deck 14 such that user 506 is outside, likely feeling the wind, and near deck boundary 512. Space component 114 may be configured to determine, based on the user information and the vehicle information determined, view 502 of a virtual space. The virtual space may additionally correspond to the rotational orientation of the wearable head-mounted display device 504 of user 506 determined. Effectuation of the determined view 502 of the virtual space, may correspond to the user seeing virtual characters 516 in a virtual helicopter 518 lifting off virtual edge 520 of a cliff to get away from zombie 522.

By way of non-limiting example, the user information may include spatial location of the user may be determined as in the arcade on Promenade Deck 11. Space component 114 may be configured to determine, based on the user information determined, a view of the virtual space. The virtual space may correspond to the spatial location (i.e., arcade on Promenade Deck 11) and the rotational orientation of the wearable head-mounted display device determined. Effectuation of presentation of the view of the virtual space, via the display of the wearable head-mounted display device, to the user may correspond to the user, for example, exploring an apocalyptic building.

Figure 2:
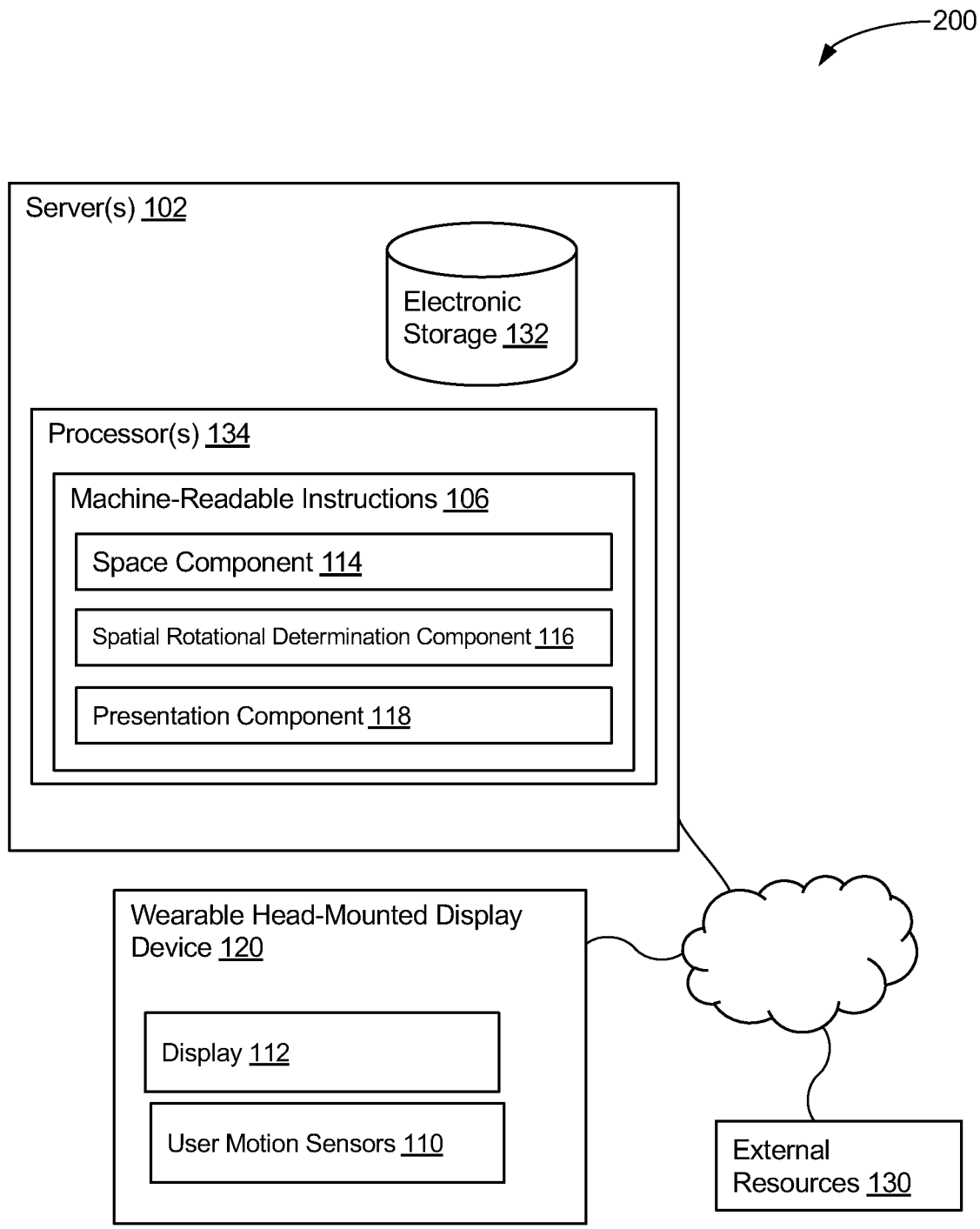
FIG. 2 illustrates a system configured to enhance accuracy of spatial location and rotational orientation determination of a wearable head-mounted display device, in accordance with one or more implementations.

In some implementations, the system may be coupled to individual vehicles. FIG. 2 illustrates a system to enhance accuracy of spatial location and rotational orientation determination of a wearable head-mounted display device, in accordance with one or more implementations. For example, the system may be communicatively coupled to individual vehicles and/or to components carried by individual vehicles, including but not limited to transceivers. For example, components of the system may be configured to communicate through one or more networks. The one or more networks may, by way of non-limiting example, include the internet.

In some implementations, server(s) 102, and/or external resources 130 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server(s) 102, and/or external resources 130 may be operatively linked via some other communication media.

External resources 130 may include sources of information outside of system 100, external entities participating with system 100, and/or other resources. In some implementations, some or all of the functionality attributed herein to external resources 130 may be provided by resources included in system 100.

Server(s) 102 may include electronic storage 132, one or more processors 134, and/or other components. Server(s) 102 may include communication lines, or ports to enable the exchange of information with a network and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 132 may comprise non-transitory storage media that electronically stores information. The electronic storage media of electronic storage 132 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 132 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 132 may include one or more virtual storage resources (e.g., cloud storage, a virtual private network, and/or other virtual storage resources). Electronic storage 132 may store software algorithms, information determined by processor(s) 134, information received from server(s) 102, and/or other information that enables server(s) 102 to function as described herein.

Processor(s) 134 may be configured to provide information processing capabilities in server(s) 102. As such, processor(s) 134 may include one or more of a digital processor, an analog processor, a digital circuit designed to process information, an analog circuit designed to process information, a state machine, and/or other mechanisms for electronically processing information. Although processor(s) 134 is shown in FIG. 1 as a single entity, this is for illustrative purposes only. In some implementations, processor(s) 134 may include a plurality of processing units. These processing units may be physically located within the same device, or processor(s) 134 may represent processing functionality of a plurality of devices operating in coordination. Processor(s) 134 may be configured to execute components 114, 116, and/or 118, and/or other components. Processor(s) 134 may be configured to execute components 114, 116, and/or 118, and/or other components by software; hardware; firmware; some combination of software, hardware, and/or firmware; and/or other mechanisms for configuring processing capabilities on processor(s) 134. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 114, 116, and/or 118 are illustrated in FIG. 1 and FIG. 2 as being implemented within a single processing unit, in implementations in which processor(s) 134 includes multiple processing units, one or more of components 114, 116, and/or 118 may be implemented remotely from the other components. The description of the functionality provided by the different components 114, 116, and/or 118 described below is for illustrative purposes, and is not intended to be limiting, as any of components 114, 116, and/or 118 may provide more or less functionality than is described. For example, one or more of components 114, 116, and/or 118 may be eliminated, and some or all of its functionality may be provided by other ones of components 114, 116, and/or 118. As another example, processor(s) 134 may be configured to execute one or more additional components that may perform some or all of the functionality attributed below to one of components 114, 116, and/or 118.

Figure 4:
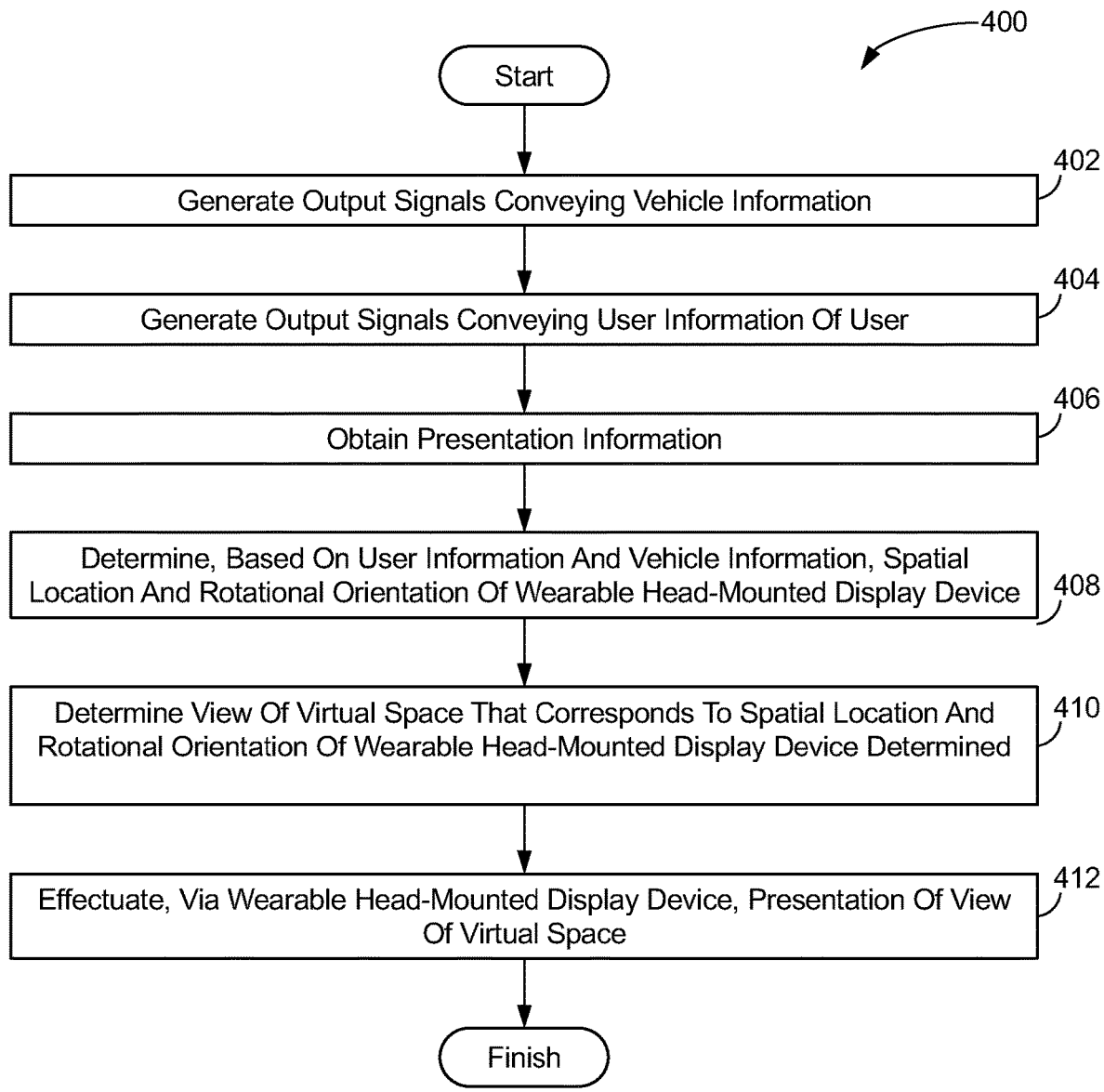
FIG. 4 illustrates a method for enhancing the accuracy of spatial location and rotational orientation determination of a wearable head-mounted display device, in accordance with one or more implementations.

FIG. 4 illustrates a method 400 for enhancing accuracy of spatial location and rotational orientation determination of a wearable head-mounted display device, in accordance with one or more implementations. The operations of method 400 presented below are intended to be illustrative. In some implementations, method 400 may be accomplished with one or more additional operations not described, and/or without one or more of the operations discussed. Additionally, the order in which the operations of method 400 are illustrated in FIG. 4 and described below is not intended to be limiting.

In some implementations, method 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

An operation 402 may include generating output signals conveying vehicle information. The vehicle information may characterize vehicle operations of a vehicle. Operation 402 may be performed by one or more hardware processors configured by machine-readable instructions including a component that is the same as or similar to vehicle sensors 108, in accordance with one or more implementations.

An operation 404 may include generating output signals conveying user information of a user. The user information may characterize motion of a wearable head-mounted display device. Operation 404 may be performed by one or more hardware processors configured by machine-readable instructions including a component that is the same as or similar to user motion sensors 110, in accordance with one or more implementations.

An operation 406 may include obtaining presentation information. The presentation information may define values of virtual space parameters. The virtual space parameters may characterize an instance of a virtual space including virtual objects. Operation 406 may be performed by one or more hardware processors configured by machine-readable instructions including a component that is the same as or similar to space component 114, in accordance with one or more implementations.

An operation 408 may include determining spatial location and rotational orientation of the wearable head-mounted display device with respect to a reference frame. The accuracy of the determination may be enhanced with respect to only using the user information. Determination may be based on the user information and the vehicle information. Operation 408 may be performed by one or more hardware processors configured by machine-readable instructions including a component that is the same as or similar to spatial rotational determination component 116, in accordance with one or more implementations.

An operation 410 may include determining a view of the virtual space that corresponds to the spatial location and the rotational orientation of the wearable head-mounted display device determined. Operation 410 may be performed by one or more hardware processors configured by machine-readable instructions including a component that is the same as or similar to space component 114, in accordance with one or more implementations.

An operation 412 may include effectuating presentation of the view of the virtual space. Effectuation may be via the wearable head-mounted display device. Operation 412 may be performed by one or more hardware processors configured by machine-readable instructions including a component that is the same as or similar to presentation component 118, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to determine spatial location and rotational orientation of a wearable head-mounted display device while accounting for unintentional motion caused by a moving vehicle, the system comprising:
    a vehicle including one or more vehicle sensors, the one or more vehicle sensors being configured to generate output signals conveying vehicle information, the vehicle information characterizing vehicle operations of the vehicle;
    a wearable head-mounted display device including a display and motion sensors, the motion sensors being configured to generate output signals conveying user information of a user of the wearable head-mounted display device, the user information conveying motion of the wearable head-mounted display device, wherein the motion of the wearable head-mounted display device is characterized by intentional user motion and unintentional user motion, the intentional user motion including purposeful motions the user intended to execute, and the unintentional user motion including involuntary motions by the user in reaction to the vehicle operations; and
    one or more physical processors configured by machine-readable instructions to:
        obtain presentation information, the presentation information defining values of virtual space parameters, the virtual space parameters characterizing an instance of a virtual space including virtual objects;
        identify the unintentional user motion from the user information based on the vehicle information characterizing the vehicle operations of the vehicle;
        identify the intentional user motion from the user information based on having identified the unintentional user motion from the user information;
        determine, based on the intentional user motion identified from the user information, spatial location and rotational orientation of the wearable head-mounted display device with respect to a reference frame so that the spatial location and rotational orientation of the wearable head-mounted display device reflects the intentional user motion and not both the intentional user motion and the unintentional user motion which would have resulted from making the determination only using the user information without also using the vehicle information to identify the unintentional user motion from the user information;
        determine a view of the virtual space that corresponds to the spatial location and the rotational orientation of the wearable head-mounted display device; and
        effectuate, via the wearable head-mounted display device, presentation of the view of the virtual space.

2. The system of claim 1, wherein the reference frame is a space through which the vehicle is moving.

3. The system of claim 2, wherein the one or more processors are further configured by the machine-readable instructions to:
    obtain the vehicle information;
    determine, based on the vehicle information, navigation information, the navigation information defining values of navigation parameters such that future vehicle movements are known; and
    determine the view of the virtual space further based on the navigation information.

4. The system of claim 1, wherein the reference frame is the vehicle.

5. The system of claim 4, wherein the one or more processors are further configured by the machine-readable instructions to:
    determine, based on the user information and the vehicle information, the spatial location of the user relative to the vehicle.

6. The system of claim 1, wherein the one or more processors are further configured by the machine-readable instructions to:
    determine the spatial location and rotational orientation of the wearable head-mounted display device at specified points in time.

7. The system of claim 1, wherein the vehicle includes one or more of a motor vehicle, a theme park ride, a tracked vehicle, an aircraft, or a watercraft.

8. A method to determine spatial location and rotational orientation of a wearable head-mounted display device while accounting for unintentional motion caused by a moving vehicle, the method comprising:

generating output signals conveying vehicle information, the vehicle information characterizing vehicle operations of a vehicle;

generating output signals conveying user information of a user of the wearable head-mounted display device, the user information conveying motion of the wearable head-mounted display device, wherein the motion of the wearable head-mounted display device is characterized by intentional user motion and unintentional user motion, the intentional user motion including purposeful motions the user intended to execute, and the unintentional user motion including involuntary motions by the user in reaction to the vehicle operations;

obtaining presentation information, the presentation information defining values of virtual space parameters, the virtual space parameters characterizing an instance of a virtual space including virtual objects;

identifying the unintentional user motion from the user information based on the vehicle information characterizing the vehicle operations of the vehicle;

identifying the intentional user motion from the user information based on having identified the unintentional user motion from the user information;

determining, based on the intentional user motion identified from the user information, spatial location and rotational orientation of the wearable head-mounted display device with respect to a reference frame so that the spatial location and rotational orientation of the wearable head-mounted display device reflects the intentional user motion and not both the intentional user motion and the unintentional user motion which would have resulted from making the determination only using the user information without also using the vehicle information to identify the unintentional user motion from the user information;

determining a view of the virtual space that corresponds to the spatial location and the rotational orientation of the wearable head-mounted display device; and effectuating, via the wearable head-mounted display device, presentation of the view of the virtual space.

9. The method of claim 8, wherein the reference frame a space through which the vehicle is moving.

10. The method of claim 9, further comprising:
obtaining the vehicle information;
determining, based on the vehicle information, navigation information, the navigation information defining values of navigation parameters such that future vehicle movements are known; and
determining the view of the virtual space further based on the navigation information.

11. The method of claim 8, wherein the reference frame is the vehicle.

12. The method of claim 11, further comprising:
determining, based on the user information and the vehicle information, the spatial location of the user relative to the vehicle.

13. The method of claim 8, further comprising:
determining the spatial location and rotational orientation of the wearable head-mounted display device at specified points in time.

14. The method of claim 8, wherein the vehicle includes one or more of a motor vehicle, a theme park ride, a tracked vehicle, an aircraft, or a watercraft.

15. A system configured to determine spatial location and rotational orientation of a wearable head-mounted display device while accounting for unintentional motion caused by a moving vehicle, the system comprising:

one or more physical processors configured by machine-readable instructions to:

obtain vehicle information, the vehicle information characterizing vehicle operations of a vehicle;

obtain presentation information, the presentation information defining values of virtual space parameters, the virtual space parameters characterizing an instance of a virtual space;

identify unintentional user motion from user information based on the vehicle information characterizing the vehicle operations of the vehicle, the user information conveying motion of a wearable head-mounted display device worn by a user, wherein the motion of the wearable head-mounted display device is characterized by intentional user motion and the unintentional user motion, the intentional user motion including purposeful motions the user intended to execute, and the unintentional user motion including involuntary motions by the user in reaction to the vehicle operations of the vehicle;

identify the intentional user motion from the user information based on having identified the unintentional user motion from the user information;

determine, based on the intentional user motion identified from the user information, spatial location and rotational orientation of the wearable head-mounted display device with respect to a reference frame so that the spatial location and rotational orientation of the wearable head-mounted display device reflects the intentional user motion and not both the intentional user motion and the unintentional user motion which would have resulted from making the determination only using the user information without also using the vehicle information to identify the unintentional user motion from the user information;

determine a view of the virtual space that corresponds to the spatial location and the rotational orientation of the wearable head-mounted display device; and effectuate, via the wearable head-mounted display device, presentation of the view of the virtual space.

* * * * *